United States Patent
Bae et al.

(10) Patent No.: US 12,198,604 B2
(45) Date of Patent: Jan. 14, 2025

(54) CONTROLLER CONFIGURED TO GENERATE DISPLAY AREA INFORMATION AND DISPLAY DEVICE INCLUDING THE SAME

(71) Applicant: SILICON WORKS CO., LTD., Daejeon (KR)

(72) Inventors: Dae Hee Bae, Daejeon (KR); Bo Sung Kim, Daejeon (KR); Jun Hun Park, Daejeon (KR); Ji Hong Yuk, Daejeon (KR); Sung Woo Han, Daejeon (KR); Ji Hoon Choi, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 0 days.

(21) Appl. No.: 18/510,098

(22) Filed: Nov. 15, 2023

(65) Prior Publication Data

US 2024/0169888 A1     May 23, 2024

Related U.S. Application Data

(63) Continuation of application No. 16/993,588, filed on Aug. 14, 2020, now Pat. No. 11,837,150.

(30) Foreign Application Priority Data

Aug. 16, 2019   (KR) ................ 10-2019-0100424
Jul. 31, 2020   (KR) ................ 10-2020-0095944

(51) Int. Cl.
*G09G 5/02*     (2006.01)
*G06T 5/70*     (2024.01)
(Continued)

(52) U.S. Cl.
CPC ............. *G09G 3/22* (2013.01); *G06T 5/70* (2024.01); *G09G 5/37* (2013.01);
(Continued)

(58) Field of Classification Search
CPC .............. G09G 3/22; G09G 5/37; G06T 5/70
(Continued)

(56) References Cited

U.S. PATENT DOCUMENTS

2005/0091571 A1   4/2005   Leichtling
2016/0329033 A1   11/2016  Woo et al.
(Continued)

FOREIGN PATENT DOCUMENTS

CN    109285860 A    1/2019
CN    111198597 A    5/2020
(Continued)

OTHER PUBLICATIONS

Office Action issued for the corresponding Chinese patent application No. 202010818465.3 on Jul. 4, 2024, 26 pages.

*Primary Examiner* — Jonathan M Blancha
(74) *Attorney, Agent, or Firm* — Birch, Stewart, Kolasch & Birch, LLP

(57) ABSTRACT

Disclosed is a display device including a display panel having a plurality of pixels, the display panel comprising a first display area having first resolution and a second display area having second resolution, the second resolution being lower than the first resolution, and a controller configured to generate display area information of each of the plurality of pixels, to blur an image that is displayed in the second display area based on the display area information, and to perform control such that the blurred image is displayed on the display panel.

19 Claims, 9 Drawing Sheets

(51) Int. Cl.
    *G09G 3/22*          (2006.01)
    *G09G 5/37*          (2006.01)
    *H04N 23/57*        (2023.01)

(52) U.S. Cl.
    CPC ............... *G09G 2320/0686* (2013.01); *G09G 2340/0407* (2013.01); *H04N 23/57* (2023.01)

(58) Field of Classification Search
    USPC ........................................................ 345/694
    See application file for complete search history.

(56) References Cited

U.S. PATENT DOCUMENTS

| | | |
|---|---|---|
| 2017/0069063 A1 | 3/2017 | Yim |
| 2017/0255786 A1 | 9/2017 | Krishnamurthi et al. |
| 2017/0372675 A1 | 12/2017 | Cho et al. |
| 2019/0108789 A1 | 4/2019 | Tsuge |
| 2020/0159369 A1 | 5/2020 | Seo et al. |

FOREIGN PATENT DOCUMENTS

| | | |
|---|---|---|
| JP | H05-216466 A | 8/1993 |
| KR | 10-2017-0040865 A | 4/2017 |
| KR | 10-2019-0130094 A | 11/2019 |
| KR | 20200057896 A | 5/2020 |

FIG. 6

| Bytes Index | | Bits Index | | | | | | | |
|---|---|---|---|---|---|---|---|---|---|
| | | 7 | 6 | 5 | 4 | 3 | 2 | 1 | 0 |
| | 7 | X | X | line1 ld | line1 rd | line2 ld | line2 rd | line3 ld | line3 rd |
| | 6 | line1 left stair width | | | | line1 right stair width | | | |
| | 5 | line2 left stair width | | | | line2 right stair width | | | |
| | 4 | line3 left stair width | | | | line3 right stair width | | | |
| | 3 | X | X | line4 ld | line4 rd | line5 ld | line5 rd | line6 ld | line6 rd |
| | 2 | line4 left stair width | | | | line4 right stair width | | | |
| | 1 | line5 left stair width | | | | line5 right stair width | | | |
| | 0 | line6 left stair width | | | | line6 right stair width | | | |

FIG. 7

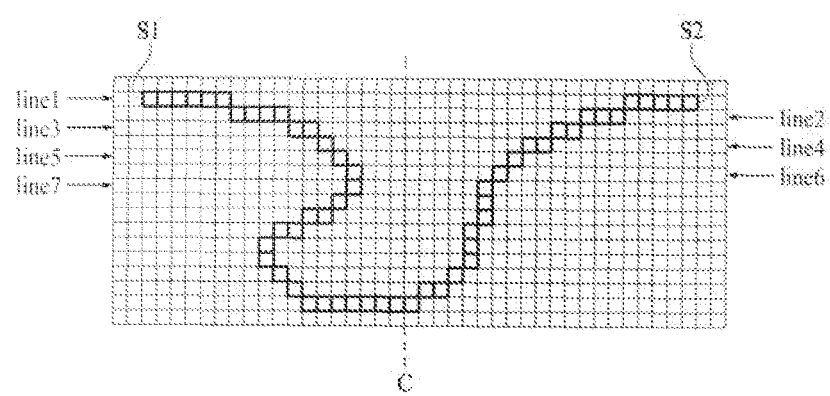

FIG. 8

|  | | Bit Index | | | | | | | |
|---|---|---|---|---|---|---|---|---|---|
|  |  | 7 | 6 | 5 | 4 | 3 | 2 | 1 | 0 |
|  | 7 | X | X | 1 | 1 | 1 | 1 | 1 | 1 |
|  | 6 | 6 | | | | 5 | | | |
|  | 5 | 4 | | | | 3 | | | |
| Byte Index | 4 | 2 | | | | 2 | | | |
|  | 3 | X | X | 1 | 1 | 1 | 1 | 1 | 1 |
|  | 2 | 1 | | | | 2 | | | |
|  | 1 | 1 | | | | 1 | | | |
|  | 0 | 0 | | | | 1 | | | |

FIG. 10

| W0 | W1 | W2 |
|----|----|----|
| W3 | W4 | W5 |
| W6 | W7 | W8 |

CONTROLLER CONFIGURED TO GENERATE DISPLAY AREA INFORMATION AND DISPLAY DEVICE INCLUDING THE SAME

CROSS-REFERENCE TO RELATED APPLICATIONS

This application a continuation application of U.S. patent application Ser. No. 16/993,588 filed on Aug. 14, 2020, which claims the benefit of and priority to the Korean Patent Application Nos. 10-2019-0100424 filed on Aug. 16, 2019 and 10-2020-0095944 filed on Jul. 31, 2020, all of which are hereby incorporated by references as if fully set forth herein.

FIELD

The present disclosure relates to a controller and a display device including the same.

BACKGROUND

With the growth of an information society, demand for a display device configured to display an image has increased in various forms. In recent years, various kinds of display devices, such as a liquid crystal display (LCD) device and an organic light emitting display (OLED) device, have been utilized.

An electronic module, such as a camera module or a sensor module, may be mounted or installed in such a display device. In the case in which an electronic module, such as a camera module or a sensor module, is mounted or installed in a display device, a camera hole may be formed in the display device, and the camera module may be disposed in the camera hole.

The camera hole may be disposed in a display area of the display device, in which an image is displayed. In this case, no image is displayed in the area in which the camera hole is formed, whereby the image displayed on the display device may be interrupted, which may be recognized by a user.

In addition, the camera hole may be disposed in a bezel area of the display device, in which case the bezel area increases.

SUMMARY

Therefore, the present disclosure relates to a controller that is capable of preventing problems resulting from limitations and shortcomings of the related art described above and a display device including the same.

It is an object of the present disclosure to provide a controller capable of performing control such that an image is displayed even in an area disposed so as to overlap a camera and a display device including the same.

It is another object of the present disclosure to provide a controller capable of efficiently controlling information about pixels provided in an area disposed so as to overlap a camera and a display device including the same.

It is another object of the present disclosure to provide a controller capable of controlling an image that is displayed in an area disposed so as to overlap a camera and a display device including the same.

It is a further object of the present disclosure to provide a controller capable of minimizing loss of pixel information in an area disposed so as to overlap a camera and a display device including the same.

In accordance with an aspect of the present disclosure, there is provided a display device including a display panel having a plurality of pixels, the display panel including a first display area having first resolution and a second display area having second resolution, the second resolution being lower than the first resolution, and a controller configured to generate display area information of each of the plurality of pixels, to blur an image that is displayed in the second display area based on the display area information, and to perform control such that the blurred image is displayed on the display panel.

In accordance with another aspect of the present disclosure, there is provided a controller including a display area information generation unit configured to generate display area information of each of a plurality of pixels based on shape information of a second display area having lower resolution than a first display area, an image processing unit configured to blur image data of the second display area based on the display area information of each of the plurality of pixels, and a control unit configured to perform control such that the blurred image data are displayed on a display panel.

BRIEF DESCRIPTION OF THE DRAWINGS

The above and other objects, features and other advantages of the present disclosure will be more clearly understood from the following detailed description taken in conjunction with the accompanying drawings, in which:

FIG. 6 is a view illustrating left border information and right border information;

FIG. 7 is a view showing an example of a second display area having a U shape;

FIG. 8 is a view showing an example of shape information of the second display area shown in FIG. 7;

FIG. 10 is a view showing an example of display area information of each of a plurality of subpixels;

DETAILED DESCRIPTION

Figure 1:
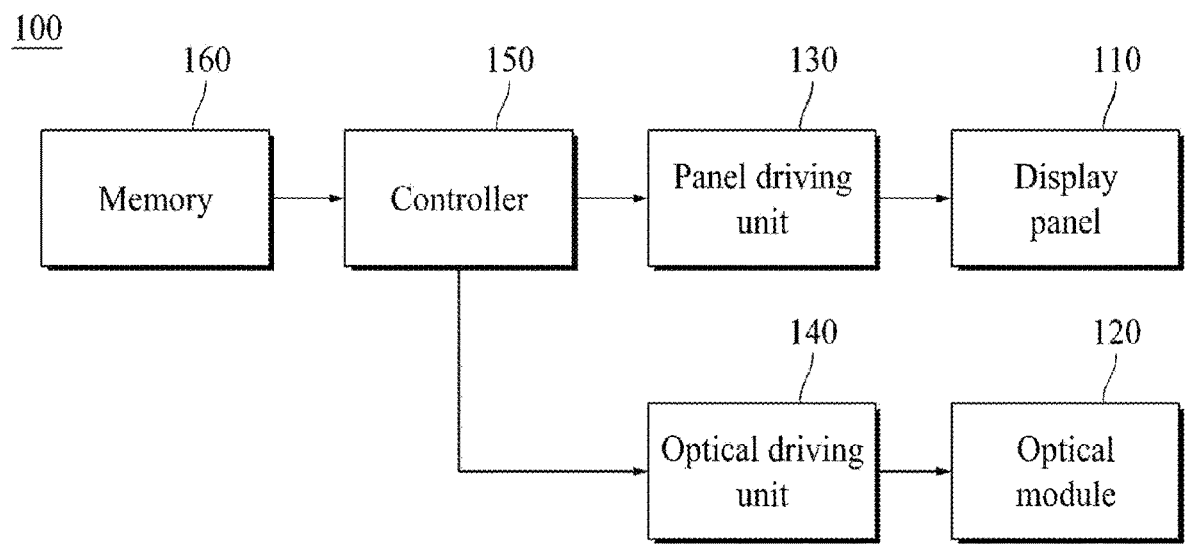
FIG. 1 is a view schematically showing the construction of a display device according to an embodiment of the present disclosure.

Wherever possible, the same reference numbers will be used throughout this specification to refer to the same or like elements. In the following description, a detailed description of the construction and function known in the technical field of the present disclosure may be omitted in the case in which the construction and the function are not related to the core construction of the present disclosure. Meanings of terms described in this specification must be understood as follows.

Advantages and features of the present disclosure and a method of achieving the same will be more clearly understood from embodiments described below with reference to the accompanying drawings. However, the present disclosure is not limited to the following embodiments but may be implemented in various different forms. The embodiments are provided merely to complete disclosure of the present disclosure and to fully provide a person having ordinary skill in the art to which the present disclosure pertains with the category of the invention. The present disclosure is defined only by the category of the claims.

The shapes, sizes, ratios, angles, and numbers disclosed in the drawings for describing embodiments of the present disclosure are merely examples, and thus the present disclosure is not limited to the illustrated details. Like reference numerals refer to like elements throughout the present specification. In the following description, when the detailed description of the relevant known function or configuration is determined to unnecessarily obscure important points of the present disclosure, the detailed description will be omitted.

In the case in which "comprise", "have", and "include" are used in the present specification, another part may also be present unless "only" is used. Terms in a singular form may include plural meanings unless noted to the contrary.

In construing an element, the element is to be construed as including an error range even if there is no explicit description thereof.

In describing a positional relationship, for example, when the positional relationship is described as "on", "above", "below", and "next", the case of no contact therebetween may be included, unless "just" or "directly" is used.

In describing a temporal relationship, for example, when the temporal order is described as "after", "subsequent", "next", and "before", the case which is not continuous may be included, unless "just" or "directly" is used.

It will be understood that, although the terms "first", "second", etc. may be used herein to describe various elements, these elements should not be limited by these terms. These terms are only used to distinguish one element from another. Therefore, a first element could be termed a second element within a technical idea of the present disclosure.

The terms "X-axis direction," "Y-axis direction," and "Z-axis direction" must not be interpreted based only on a geometrical relationship in which the above directions are perpendicular to each other, and may mean having wider directivity within a range within which the construction of the present disclosure is functionally applicable.

It should be understood that the term "at least one" includes all combinations related with any one item. For example, "at least one among a first element, a second element, and a third element" may include all combinations of two or more elements selected from among the first, second, and third elements as well as each element of the first, second, and third elements.

Features of various embodiments of the present disclosure may be partially or completely coupled to or combined with each other, and may be variously inter-operated with each other and driven technically as will be easily understood by those skilled in the art. The embodiments of the present disclosure may be carried out independently from each other, or may be carried out together in an interrelated manner.

Hereinafter, embodiments of the present disclosure will be described in detail with reference to the accompanying drawings.

Figure 2:
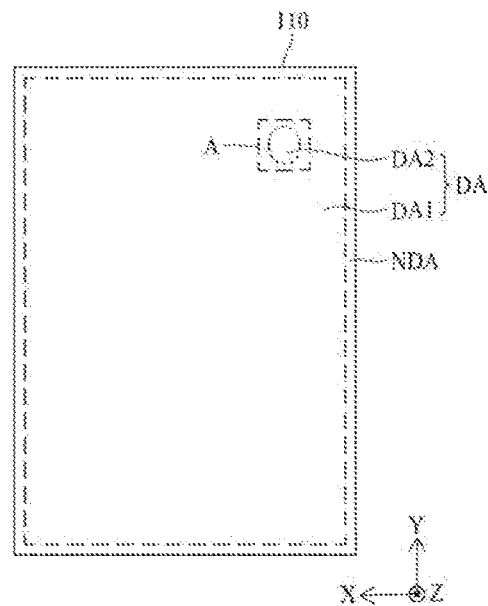
FIG. 2 is a plan view schematically showing a display panel of FIG. 1.
Figure 3:
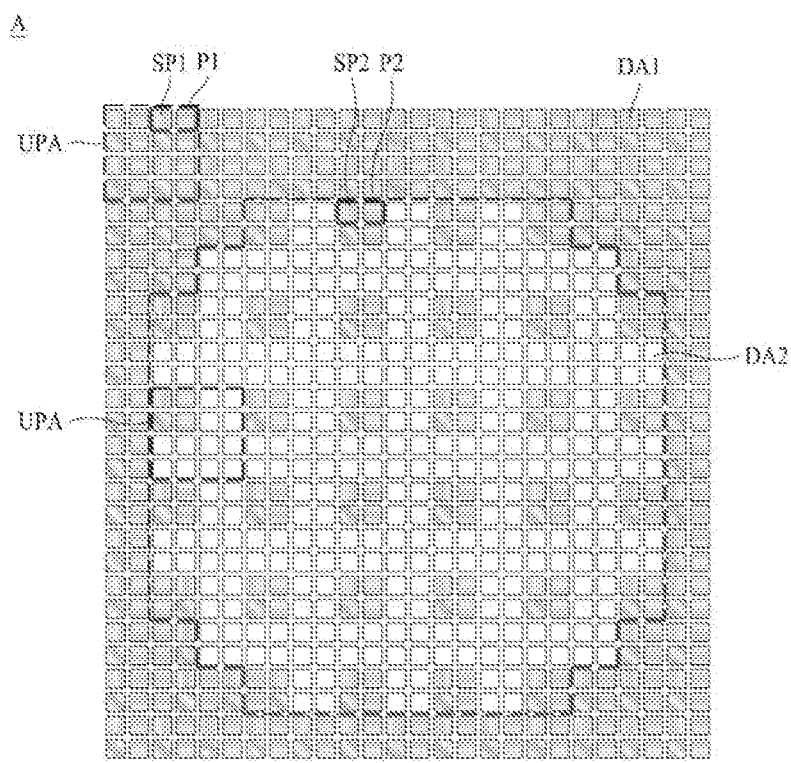
FIG. 3 is an enlarged view showing pixels provided in area A of FIG. 2.

FIG. 1 is a view schematically showing the construction of a display device 100 according to an embodiment of the present disclosure, FIG. 2 is a plan view schematically showing a display panel of FIG. 1, and FIG. 3 is an enlarged view showing pixels provided in area A of FIG. 2.

Referring to FIGS. 1 to 3, the display device 100 according to the embodiment of the present disclosure includes a display panel 110, an optical module 120, a panel driving unit 130, an optical driving unit 140, a controller 150, and a memory 160.

The display panel 110 includes a plurality of pixels, and displays a color image. The display panel 110 may be realized using an organic light-emitting display panel, a liquid crystal display panel, a plasma display panel, a quantum dot light-emitting display panel, or an electrophoretic display panel.

The display panel 110 may include a display area DA, in which pixels are formed to display an image, and a non-display area NDA, which displays no image.

The non-display area NDA may be disposed so as to surround the display area DA. The panel driving unit 130, which supplies various kinds of signals to a plurality of signal lines in the display area DA, and a link unit (not shown), configured to connect the panel driving unit 130 and the plurality of signal lines to each other, may be formed in the non-display area NDA.

In the display area DA, a plurality of pixels is disposed to display an image. As shown in FIG. 2, the display area DA includes a first display area DA1 and a second display area DA2.

The first display area DA1 is an area that does not overlap an area CA, in which the optical module 120 is disposed, and displays an image irrespective of operation of the optical module 120. The first display area DA1 may be formed so as to have a large size.

A plurality of first pixels P1, each of which includes at least two first subpixels SP1, may be provided in the first display area DA1. Each of the plurality of first pixels P1 may include a light-emitting pixel. Specifically, each of the at least two first subpixels SP1, included in each of the first pixels P1, may be a light-emitting subpixel including a light-emitting device to emit a predetermined color of light. Each of the first pixels P1 may include at least two of a red subpixel configured to emit red light, a green subpixel configured to emit green light, and a blue subpixel configured to emit blue light. As an example, one of the first pixels P1 may include a red subpixel and a green subpixel, and an adjacent one of the first pixels P1 may include a blue subpixel and a green subpixel. As another example, each of the first pixels P1 may include a red subpixel, a green subpixel, and a blue subpixel.

The second display area DA2 overlaps the area CA, in which the optical module 120 is disposed. An image to be displayed in the second display area DA2 may be decided depending on whether or not the optical module 120 is operated. Specifically, in the case in which the optical module 120 is not operated, the second display area DA2 may display an image together with the first display area DA1. In the case in which the optical module 120 is operated, on the other hand, the second display area DA2 may display no image or may display a black image. At this time, an image may be displayed in the first display area DA1.

The size, position, and shape of the second display area DA2 may be decided in consideration of the optical module 120. The second display area DA2 may be provided at the position corresponding to the optical module 120. In addition, the second display area DA2 may be provided so as to have a size including therein the area CA, in which the optical module 120 is disposed.

A plurality of second pixels P2, each of which includes at least two second subpixels SP2, may be provided in the second display area DA2. In the second display area DA2, the plurality of second pixels P2 may include light-emitting pixels and non-light-emitting pixels, unlike the first display area DA1. Each of the light-emitting pixels may be an area including a light-emitting device to emit light, and each of the non-light-emitting pixels may be an area including no light-emitting device and transmitting external light. That is, areas including no light-emitting devices and transmitting external light may be provided in the second display area DA2, unlike the first display area DA1.

Each of the at least two second subpixels SP2, included in each of the light-emitting pixels, among the second pixels P2, may be a light-emitting subpixel including a light-emitting device to emit a predetermined color of light. Each of the light-emitting pixels, among the second pixels P2, may include at least two of a red subpixel configured to emit red light, a green subpixel configured to emit green light, and a blue subpixel configured to emit blue light. As an example, one of the light-emitting pixels, among the second pixels P2, may include a red subpixel and a green subpixel, and an adjacent one of the light-emitting pixels, among the second pixels P2, may include a blue subpixel and a green subpixel. As another example, each of the light-emitting pixels, among the second pixels P2, may include a red subpixel, a green subpixel, and a blue subpixel.

Each of the at least two second subpixels SP2, included in each of the non-light-emitting pixels, among the second pixels P2, may be a non-light-emitting subpixel including no light-emitting device and transmitting external light.

As a result, the number of light-emitting subpixels provided in a unit pixel area UPA of the second display area DA2 may be less than the number of light-emitting subpixels provided in the unit pixel area UPA of the first display area DA1. For example, as shown in FIG. 3, four light-emitting subpixels may be provided in the unit pixel area UPA of the second display area DA2, whereas 16 light-emitting subpixels may be provided in the unit pixel area UPA of the first display area DA1.

Light transmittance of the second display area DA2 may be changed depending on the number of light-emitting subpixels provided in the unit pixel area UPA thereof. In the case in which the number of light-emitting subpixels provided in the unit pixel area UPA is increased, luminance and resolution of the second display area DA2 may increase, whereas light transmittance of the second display area DA2 may decrease. In the case in which the number of light-emitting subpixels provided in the unit pixel area UPA is decreased, on the other hand, luminance and resolution of the second display area DA2 may decrease, whereas light transmittance of the second display area DA2 may increase. In a display panel 110 according to an embodiment of the present disclosure, the number of light-emitting subpixels may be decided in consideration of luminance, resolution, and light transmittance of the second display area DA2.

The first display area DA1 and the second display area DA2, described above, may be different in transmittance and resolution from each other. The first display area DA1 may have first transmittance, and the second display area DA2 may have second transmittance, which is higher than the first transmittance. In addition, the first display area DA1 may have first resolution, and the second display area DA2 may have second resolution, which is lower than the first resolution.

The optical module 120 may be disposed at the rear surface of the display panel 110. The optical module 120 may be provided so as to overlap the display area DA, specifically the second display area DA2, of the display panel 110. The optical module 120 may include all components configured to use external light input through the display panel 110. For example, the optical module 120 may be a camera. However, the present disclosure is not limited thereto. The optical module 120 may be an ambient light sensor or a fingerprint sensor.

The panel driving unit 130 controls driving of the display panel 110 based on a control signal received from the controller 150. To this end, the panel driving unit 130 includes a gate driving unit and a data driving unit.

The gate driving unit generates gate signals for driving gate lines of the display panel 110 in response to a gate control signal received from the controller 150. The gate driving unit supplies the generated gate signals to the subpixels SP1 and SP2 of the pixels P1 and P2 included in the display panel 110 via the gate lines.

The data driving unit receives a data control signal and an image data signal from the controller 150. The data driving unit converts a digital-type image data signal into an analog-type image data signal in response to the data control signal received from the controller 150. The data driving unit supplies the converted image data signal to the subpixels SP1 and SP2 of the pixels P1 and P2 included in the display panel 110 via data lines.

The optical driving unit 140 controls driving of the optical module 120 based on a control signal received from the controller 150.

The memory 160 stores shape information of the second display area DA2. The shape information of the second display area DA2 includes position information of a starting point, vertical length information of the second display area, and line-based direction information and width information indicating the border of the second display area.

The controller 150 changes an image that is displayed in at least one of the first display area DA1 and the second display area DA2 of the display panel 110 using the shape information of the second display area DA2 stored in the memory 160. Specifically, the controller 150 may generate display area information and border information of each of the plurality of pixels using the shape information of the second display area DA2. The controller 150 may changes an image that is displayed on the display panel 110 using at least one of the display area information and the border information of each of the plurality of pixels, and may perform control such that the changed image is displayed on the display panel 110.

Hereinafter, the memory 160 and the controller 150 will be described in more detail with reference to FIGS. 4 to 12.

Figure 4:
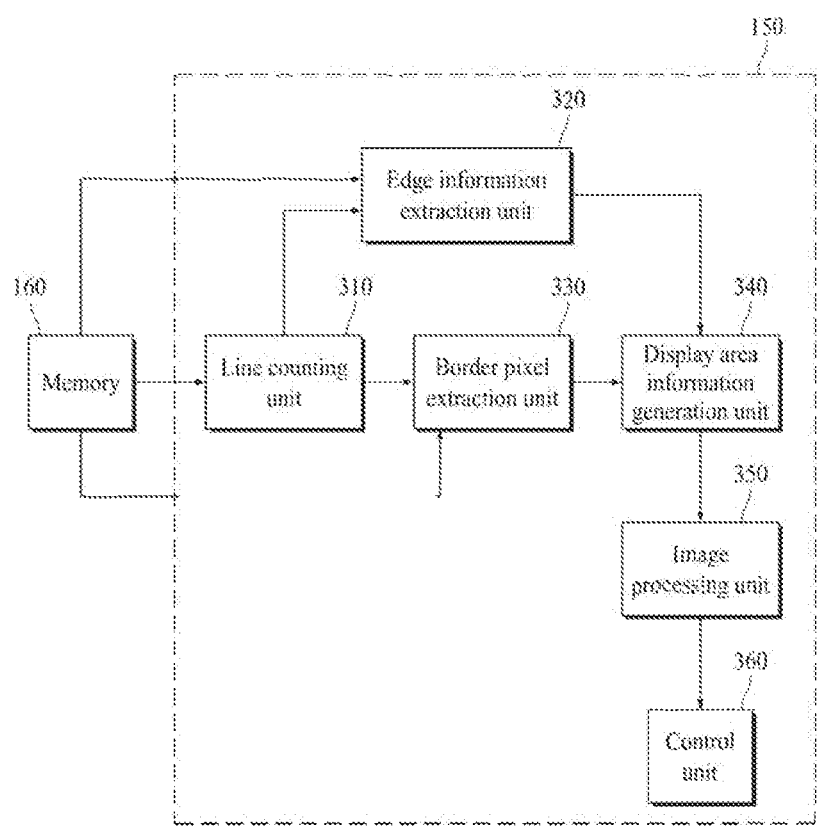
FIG. 4 is a view showing the construction of a memory and a controller.
Figure 5A:
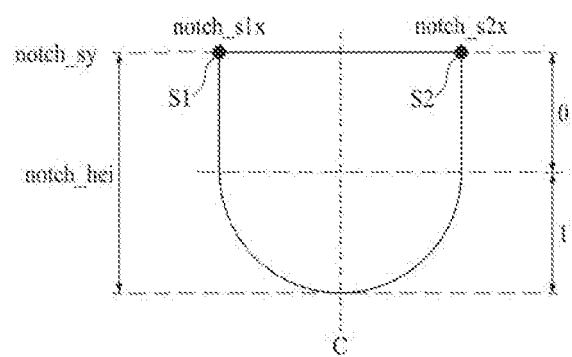
FIG. 5A is a view illustrating a starting point and vertical length of a second display area and direction information when the second display area has a U shape.
Figure 5B:
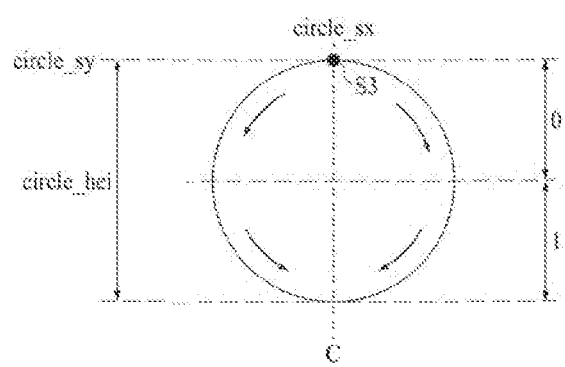
FIG. 5B is a view illustrating a starting point and vertical length of a second display area and direction information when the second display area has a circular shape.
Figure 9:
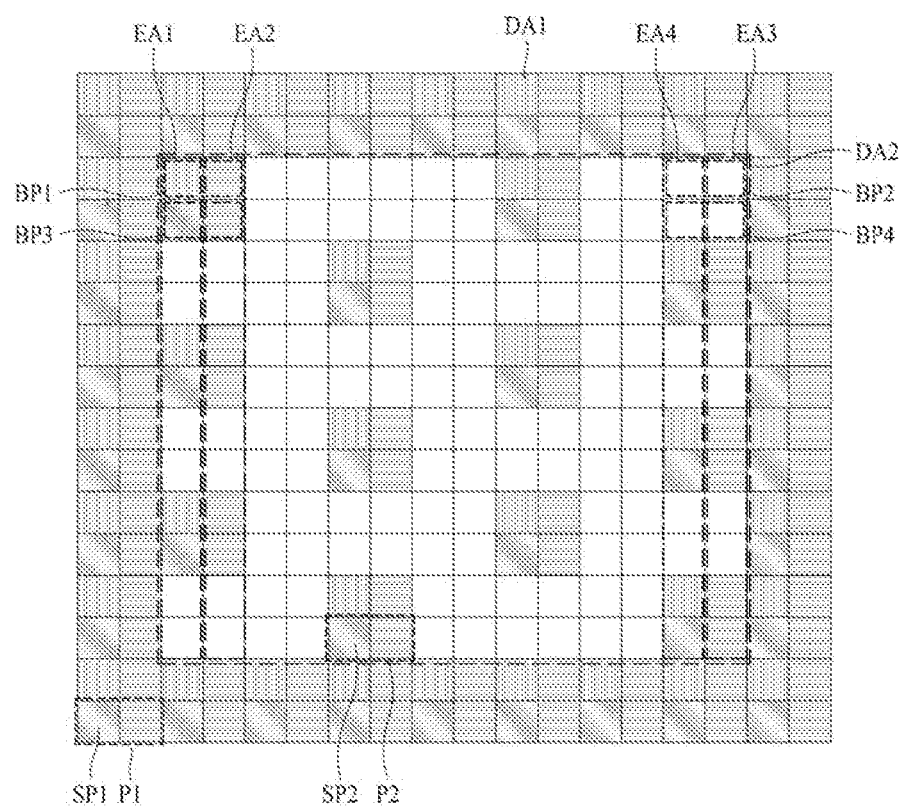
FIG. 9 is a view illustrating an edge area and a border pixel.
Figure 10:
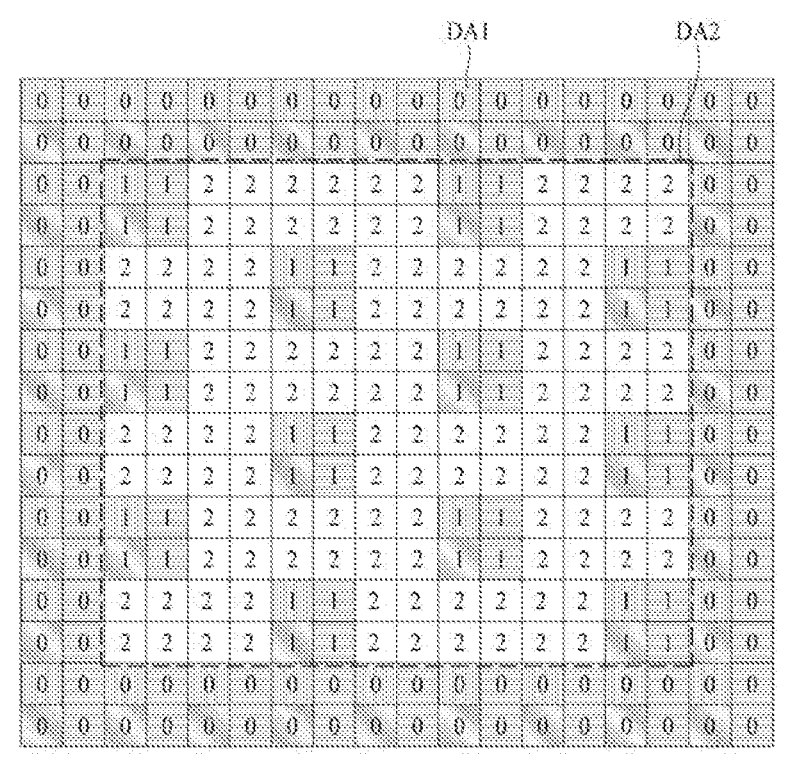
Figures 11, 12:
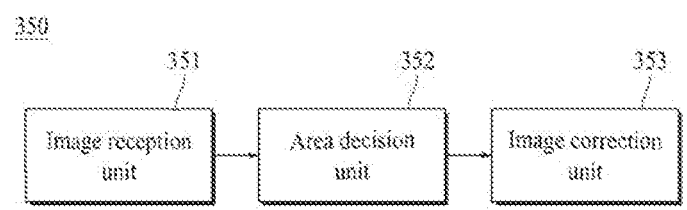
FIG. 11 is a view showing the construction of an image processing unit of FIG. 4.
FIG. 12 is a view showing an example of a blurring filter.

FIG. 4 is a view showing the construction of the memory and the controller. FIG. 5A is a view illustrating a starting point and vertical length of the second display area and direction information when the second display area has a U shape, FIG. 5B is a view illustrating a starting point and vertical length of the second display area and direction information when the second display area has a circular shape, and FIG. 6 is a view illustrating left border information and right border information. FIG. 7 is a view showing an example of a second display area having a U shape, and FIG. 8 is a view showing an example of the shape information of the second display area shown in FIG. 7. FIG. 9 is a view illustrating an edge area and a border pixel, and FIG. 10 is a view showing an example of display area information of each of a plurality of subpixels. FIG. 11 is a view showing the construction of an image processing unit of FIG. 4, and FIG. 12 is a view showing an example of a blurring filter.

Referring to FIGS. 4 to 12, the memory 160 stores the shape information of the second display area DA2, and the controller 150 corrects an image that is displayed in at least one of the first display area DA1 and the second display area DA2 of the display panel 110 using the shape information of the second display area DA2 stored in the memory 160.

The shape information of the second display area DA2 may include position information of a starting point, vertical length information of the second display area DA2, left border information about a left border located at the left side based on a central axis C of the second display area DA2, and right border information about a right border located at the right side based on the central axis C of the second display area DA2.

The position information of the starting point may include X-axis and Y-axis coordinate values at a certain point of the border of the second display area DA2. One or more starting points may be included depending on the shape of the second display area DA2.

As an example, as shown in FIG. 5A, the second display area DA2 may have a U shape. In the case in which the second display area DA2 has a U shape, a plurality of starting points may be provided. The starting points may include a first starting point S1 located at the left side of the central axis C and a second starting point S2 located at the right side of the central axis C.

Position information of the first starting point S1 may include an X-axis value notch_s1x of the first starting point S1 and a Y-axis value notch_sy of the first starting point S1. Position information of the second starting point S2 may include an X-axis value notch_s2x of the second starting point S2 and a Y-axis value notch_sy of the second starting point S2. The Y-axis values of the first starting point S1 and the second starting point S2 may be identical to each other, and the X-axis values of the first starting point S1 and the second starting point S2 may be different from each other. However, the present disclosure is not limited thereto. Both the Y-axis values and the X-axis values of the first starting point S1 and the second starting point S2 may be different from each other.

As another example, as shown in FIG. 5B, the second display area DA2 may have a circular shape. In the case in which the second display area DA2 has a circular shape, a single starting point may be provided. The starting point may include a third starting point S3 located at the central axis C. Position information of the third starting point S3 may include an X-axis value circle_sx of the third starting point S3 and a Y-axis value circle_sy of the third starting point S3.

The vertical length information of the second display area DA2 may include the vertical length of the shape of the second display area DA2. The vertical length of the shape of the second display area DA2 may correspond to the difference between the smallest Y-axis value and the largest Y-axis value, among coordinate values of a plurality of points constituting the border of the second display area DA2. At this time, the y-axis value of the starting point may be the smallest Y-axis value or the largest Y-axis value.

As an example, in the case in which the second display area DA2 has a U shape, as shown in FIG. 5A, the vertical length information of the second display area DA2 may include the largest value notch_hei, among vertical lengths between the plurality of points constituting the border of the second display area DA2 and the first starting point S1.

As another example, in the case in which the second display area DA2 has a circular shape, as shown in FIG. 5B, the vertical length information of the second display area DA2 may include the largest value circle_hei, among vertical lengths between the plurality of points constituting the border of the second display area DA2 and the third starting point S3.

The left border information, which is information about the left border located at the left side based on the central axis C of the second display area DA2, includes direction information and width information of each of a plurality of lines disposed within the vertical length from the starting point.

The left border information may include direction information and width information of each of a first line, at which the starting point is located, to an n-th line. At this time, n may correspond to the vertical length of the second display area DA2. For example, the vertical length of the second display area DA2 may be 20, in which case the left border information may include direction information and width information of each of 20 lines from a first line, at which the starting point is located, to a 20-th line.

The direction information included in the left border information may indicate a direction in which the left border located at the left side based on the central axis C of the second display area DA2 moves from the first line to the n-th line.

Specifically, in the case in which the distance between the central axis C and a left border provided at a previous line is equal to or less than the distance between the central axis C and a left border provided at a relevant line, the direction information included in the left border information may have a first direction value. That is, in the case in which the left border is parallel to or becomes distant from the central axis C, the direction information included in the left border information may have a first direction value.

For example, in the case in which the left border is parallel to the central axis C, as shown in FIG. 5A, the direction information included in the left border information may have a first direction value of 0. Alternatively, in the case in which the left border becomes distant from the central axis C, as shown in FIG. 5B, the direction information included in the left border information may have a first direction value of 0.

In the case in which the distance between the central axis C and the left border provided at the previous line is greater than the distance between the central axis C and the left border provided at the relevant line, the direction information included in the left border information may have a second direction value. That is, in the case in which the left border becomes close to the central axis C, the direction information included in the left border information may have a second direction value.

For example, in the case in which the left border becomes close to the central axis C, as shown in FIGS. 5A and 5B, the direction information included in the left border information may have a second direction value of 1.

The width information included in the left border information may include the width of the left border at each of the first line to the n-th line. At this time, the width may correspond to the number of pixels or subpixels provided in a relevant line. The width of the left border at each of the first line to the n-th line may be sequentially stored as the width information included in the left border information.

The right border information, which is information about the right border located at the right side based on the central axis C of the second display area DA2, includes direction information and width information of each of a plurality of lines disposed within the vertical length from the starting point.

The right border information may include direction information and width information of each of a first line, at which the starting point is located, to an n-th line. At this time, n may correspond to the vertical length of the second display area DA2.

The direction information included in the right border information may indicate a direction in which the right border located at the right side based on the central axis C of the second display area DA2 moves from the first line to the n-th line.

Specifically, in the case in which the distance between the central axis C and a right border provided at a previous line is equal to or less than the distance between the central axis C and a right border provided at a relevant line, the direction information included in the right border information may have a first direction value. That is, in the case in which the right border is parallel to or becomes distant from the central axis C, the direction information included in the right border information may have a first direction value.

For example, in the case in which the right border is parallel to the central axis C, as shown in FIG. 5A, the direction information included in the right border information may have a first direction value of 0. Alternatively, in the case in which the right border becomes distant from the central axis C, as shown in FIG. 5B, the direction information included in the right border information may have a first direction value of 0.

In the case in which the distance between the central axis C and the right border provided at the previous line is greater than the distance between the central axis C and the right border provided at the relevant line, the direction information included in the right border information may have a second direction value. That is, in the case in which the right border becomes close to the central axis C, the direction information included in the right border information may have a second direction value.

For example, in the case in which the right border becomes close to the central axis C, as shown in FIGS. 5A and 5B, the direction information included in the right border information may have a second direction value of 1.

The width information included in the right border information may include the width of the right border at each of the first line to the n-th line. At this time, the width may correspond to the number of pixels or subpixels provided in a relevant line. The width of the right border at each of the first line to the n-th line may be sequentially stored as the width information included in the right border information.

FIGS. 5A and 5B illustrate that the first direction value is 0 and the second direction value is 1. However, the present disclosure is not limited thereto. In another embodiment, the first direction value may be 1 and the second direction value may be 0.

The left border information and the right border information, described above, may be stored in the memory 160 while having a structure shown in FIG. 6. For example, the left border information and the right border information of each of six lines may be stored in 8 bytes.

Direction information of each of three successive lines may be stored in 1 byte. For example, in 1 byte, among 8 bytes, direction information line1 ld of the left border at a first line, direction information line1 rd of the right border at the first line, direction information line2 ld of the left border at a second line, direction information line2 rd of the right border at the second line, direction information line3 ld of the left border at a third line, and direction information line3 rd of the right border at the third line may be sequentially stored in 1 bit each.

Width information of each of three successive lines may be stored in 3 bytes. For example, in 3 bytes, among 8 bytes, width information of the left border at the first line, width information of the right border at the first line, width information of the left border at the second line, width information of the right border at the second line, width information of the left border at the third line, and width information of the right border at the third line may be sequentially stored in 4 bits each.

Direction information of each of three lines following the previously stored lines may be stored in 1 byte. For example, in 1 byte, among 8 bytes, direction information line4 ld of the left border at a fourth line, direction information line4 rd of the right border at the fourth line, direction information line5 ld of the left border at a fifth line, direction information line5 rd of the right border at the fifth line, direction information line6 ld of the left border at a sixth line, and direction information line6 rd of the right border at the sixth line may be stored in 1 bit each.

Width information of each of three lines following the previously stored lines may be stored in 3 bytes. For example, in 3 bytes, among 8 bytes, width information of the left border at the fourth line, width information of the right border at the fourth line, width information of the left border at the fifth line, width information of the right border at the fifth line, width information of the left border at the sixth line, and width information of the right border at the sixth line may be stored in 4 bits each.

Hereinafter, concrete examples of the left border information and the right border information will be described with reference to FIGS. 7 and 8.

The second display area DA2 may have a U shape, as shown in FIG. 7. In this case, starting points may include a first starting point S1 located at the left side of the central axis C and a second starting point S2 located at the right side of the central axis C.

Shape information of the second display area DA2 shown in FIG. 7 may include direction information and width information of each of a first line, at which the starting points S1 and S2 are located, to an n-th line.

Since the left border at the first line line1, at which the starting points S1 and S2 are located, becomes close to the central axis C, the direction information of the left border at the first line line1 may have a second direction value of, for example, 1. In addition, since the right border at the first line line1 becomes close to the central axis C, the direction information of the right border at the first line line1 may have a second direction value of, for example, 1.

The width information of the left border at the first line line1 may indicate the horizontal distance between the leftmost border pixel of the first line line1 and the leftmost border pixel of a second line line2, which is located next thereto. Since the horizontal distance between the leftmost border pixel of the first line line1 and the leftmost border pixel of the second line line2 corresponds to six pixels, the width information of the left border at the first line line1 may be 6.

The width information of the right border at the first line line1 may indicate the horizontal distance between the rightmost border pixel of the first line line1 and the rightmost border pixel of the second line line2, which is located next thereto. Since the horizontal distance between the rightmost border pixel of the first line line1 and the rightmost border pixel of the second line line2 corresponds to five pixels, the width information of the right border at the first line line1 may be 5.

It can be seen based on the width information and the direction information of the first line line1 that the leftmost border pixel of the second line line2 is disposed at the position of the second line line2 moved from the leftmost border pixel of the first line line1 to the central axis C by six pixels. In addition, it can be seen that the rightmost border pixel of the second line line2 is disposed at the position of the second line line2 moved from the rightmost border pixel of the first line line1 to the central axis C by five pixels.

Since the left border at the second line line2 becomes close to the central axis C, the direction information of the left border at the second line line2 may have a second direction value of, for example, 1. In addition, since the right border at the second line line2 becomes close to the central axis C, the direction information of the right border at the second line line2 may have a second direction value of, for example, 1.

The width information of the left border at the second line line2 may indicate the horizontal distance between the leftmost border pixel of the second line line2 and the leftmost border pixel of a third line line3, which is located next thereto. Since the horizontal distance between the leftmost border pixel of the second line line2 and the leftmost border pixel of the third line line3 corresponds to four pixels, the width information of the left border at the second line line2 may be 4.

The width information of the right border at the second line line2 may indicate the horizontal distance between the rightmost border pixel of the second line line2 and the rightmost border pixel of the third line line3, which is located next thereto. Since the horizontal distance between the rightmost border pixel of the second line line2 and the rightmost border pixel of the third line line3 corresponds to three pixels, the width information of the right border at the second line line2 may be 3.

It can be seen based on the width information and the direction information of the second line line2 that the leftmost border pixel of the third line line3 is disposed at the position of the third line line3 moved from the leftmost border pixel of the second line line2 to the central axis C by four pixels. In addition, it can be seen that the rightmost border pixel of the third line line3 is disposed at the position of the third line line3 moved from the rightmost border pixel of the second line line2 to the central axis C by three pixels.

The direction information and the width information of each of the third line line3 to a sixth line line6 may be set in the same manner as the direction information and the width information described above. In an embodiment, in the case in which the distance between a border at a relevant line and the central axis C is equal to the distance between a border at a next line and the central axis C, the width information may be set to 0. For example, as shown in FIG. 7, the distance between the leftmost border pixel of the sixth line line6 and the central axis C may be equal to the distance between the leftmost border pixel of the seventh line line7 and the central axis C. In this case, the width information of the left border at the sixth line line6 may be set to 0, since the horizontal distance between the leftmost border pixel of the seventh line line7 and the leftmost border pixel of the sixth line line6 is 0.

The display device 100 according to the embodiment of the present disclosure may sequentially store the direction information and the width information of each of the first line to the n-th line in the memory 160 in the order of line. The display device 100 according to the embodiment of the present disclosure is capable of easily acquiring the border of the second display area based only on the position information of the starting point and the vertical length information, the line-based direction information, and the width information of the second display area, since the direction information and the width information of each of the first line to the n-th line are sequentially stored in the order of line.

Consequently, the display device 100 according to the embodiment of the present disclosure is capable of minimizing the amount of information stored in the memory 160, whereby a small-capacity memory 160 may be used. In addition, the display device 100 according to the embodiment of the present disclosure is capable of acquiring the border of the second display area DA2 through simple calculation, whereby computational load is low in processing for individually controlling the first display area DA1 and the second display area DA2.

Also, in the display device 100 according to the embodiment of the present disclosure, it is sufficient to change only the shape information of the second display area DA2 stored in the memory 160, whereby it is possible to easily change the shape of the second display area DA2.

Meanwhile, the memory 160 may further store edge information of edge areas EA1, EA2, EA3, and EA4 in the second display area DA2. The edge areas EA1, EA2, EA3, and EA4 may include a first edge area EA1 including second subpixels SP2 provided in a first column of the second display area DA2, which is the disposed at the leftmost side thereof, a second edge area EA2 including second subpixels SP2 provided in a second column of the second display area DA2, which is disposed adjacent to the first column, a third edge area EA3 including second subpixels SP2 provided in a third column of the second display area DA2, which is the disposed at the rightmost side thereof, and a fourth edge area EA4 including second subpixels SP2 provided in a fourth column of the second display area DA2, which is disposed adjacent to the third column.

Edge information may include information about the second subpixels SP2 provided in each of the first to fourth edge areas EA1, EA2, EA3, and EA4. The edge information may include information indicating whether each of the second subpixels SP2 provided in each of the edge areas EA1, EA2, EA3, and EA4 is a light-emitting subpixel or a non-light-emitting subpixel. In the case in which each of the second subpixels SP2 is a light-emitting subpixel, the edge information may have a first value of, for example, 1. In the case in which each of the second subpixels SP2 is a non-light-emitting subpixel, the edge information may have a second value of, for example, 0.

The edge information may include an arrangement in which the second subpixels SP2 provided in each of the edge areas EA1, EA2, EA3, and EA4 are sequentially stored according to the information thereabout. For example, in the case in which the first edge area EA1 is configured as shown in FIG. 9, the edge information of the first edge area EA1 may include an arrangement of "110011001100". Meanwhile, in the case in which the third edge area EA3 is configured as shown in FIG. 9, the edge information of the third edge area EA3 may include an arrangement of "001100110011".

The display device 100 according to the embodiment of the present disclosure is capable of individually control the second subpixels SP2 provided in the edge areas EA1, EA2, EA3, and EA4, since the edge information is stored in the memory 160. Since the edge areas EA1, EA2, EA3, and EA4 of the second display area DA2 are disposed adjacent to the first display area DA1, the edge areas EA1, EA2, EA3, and EA4 of the second display area DA2 may be more easily recognized than the middle areas of the second display area DA2 due to a difference in transmittance or resolution. In order to prevent the edge areas EA1, EA2, EA3, and EA4 of the second display area DA2 from being recognized by a user, it may be necessary for the second subpixels SP2 provided in the edge areas EA1, EA2, EA3, and EA4 of the second display area DA2 to be controlled in a different manner from the second subpixels SP2 provided in the middle areas or to have a different structure than the second subpixels SP2 provided in the middle areas.

The display device 100 according to the embodiment of the present disclosure is capable of individually controlling the second subpixels SP2 provided in the edge areas EA1, EA2, EA3, and EA4 using the edge information stored in the memory 160 as needed, whereby it is possible to satisfy various demands.

Referring back to FIG. 4, the controller 150 generates display area information and border information using the shape information of the second display area DA2 stored in the memory 160. The controller 150 may correct an image that is displayed in at least one of the first display area DA1 and the second display area DA2 of the display panel 110 using the display area information and the border information, and may perform control such that the corrected image is displayed on the display panel 110.

To this end, the controller 150 may include a line counting unit 310, an edge information extraction unit 320, a border pixel extraction unit 330, a display area information generation unit 340, an image processing unit 350, and a control unit 360.

The line counting unit 310 may count a line value from the first line of the display panel 110 in which the plurality of pixels P is provided one by one, and may provide the counted line value to the border pixel extraction unit 330 and the edge information extraction unit 320. The line counting unit 310 may determine whether the counted line value corresponds to the first line, at which the starting point is disposed, using the position information of the starting point stored in the memory 160. Upon the line counting unit 310 determining that the counted line value corresponds to the first line, at which the starting point is disposed, the border pixel extraction unit 330 and the edge information extraction unit 320 may retrieve the shape information of the second display area DA2 from the memory 160.

The edge information extraction unit 320 may extract information about second subpixels SP2 provided in a relevant line from the edge information stored in the memory 160. Here, the relevant line may be a line corresponding to the line value provided by the line counting unit 310.

The border pixel extraction unit 330 may extract the leftmost border pixel and the rightmost border pixel from a relevant line using the position information of the starting point, the line-based direction information, and the width information stored in the memory 160. Here, the relevant line may be a line corresponding to the line value provided by the line counting unit 310. The leftmost border pixel may be a pixel disposed at the leftmost side of the relevant line, among the second pixels P2 provided in the second display area DA2. The rightmost border pixel may be a pixel disposed at the rightmost side of the relevant line, among the second pixels P2 provided in the second display area DA2.

The border pixel extraction unit 330 may extract the leftmost border pixel and the rightmost border pixel of each of the first line, at which the starting point is disposed, to the n-th line in the order of line. The border pixel extraction unit 330 may extract the leftmost border pixel and the rightmost border pixel of a relevant line using the leftmost border pixel and the rightmost border pixel of a previous line, direction information of the previous line, and width information of the previous line.

Specifically, the line value corresponding to the first line, at which the starting point is located, from the line counting unit 310 may be input to the border pixel extraction unit 330. As shown in FIG. 9, the border pixel extraction unit 330 may extract the leftmost border pixel BP1 and the rightmost border pixel BP2 of the first line using the position information of the starting point.

At this time, in the case in which the second display area DA2 has a U shape, the pixel disposed at the position corresponding to the first starting point S1 may be the leftmost border pixel BP1, and the pixel disposed at the position corresponding to the second starting point S2 may be the rightmost border pixel BP2. Meanwhile, in the case in which the second display area DA2 has a circular shape, unlike what is shown in FIG. 9, the pixel disposed at the position corresponding to the starting point may be the leftmost border pixel BP1 and the rightmost border pixel BP2.

The line value corresponding to the second line, which is disposed next to the first line, from the line counting unit 310 may be input to the border pixel extraction unit 330. The border pixel extraction unit 330 may extract the leftmost border pixel BP3 and the rightmost border pixel BP4 of the second line using the leftmost border pixel BP1 and the rightmost border pixel BP2 of the first line, direction information of the first line, and width information of the first line.

In the case in which the direction information of the left border of the first line has a first direction value, the leftmost border pixel BP3 of the second line may be a pixel disposed at the position of the second line moved from the leftmost border pixel BP1 of the first line in the direction opposite the central axis C by the number corresponding to the width information of the left border of the first line. The Y-axis value of the leftmost border pixel BP3 of the second line may have a value higher by 1 than the Y-axis value of the leftmost border pixel BP1 of the first line, and the X-axis value of the leftmost border pixel BP3 of the second line may have a value obtained by subtracting the value corresponding to the width information of the left border of the first line from the X-axis value of the leftmost border pixel BP1 of the first line.

In the case in which the direction information of the left border of the first line has a second direction value, the leftmost border pixel BP3 of the second line may be a pixel disposed at the position of the second line moved from the leftmost border pixel BP1 of the first line toward the central axis C by the number corresponding to the width information of the left border of the first line. The Y-axis value of the leftmost border pixel BP3 of the second line may have a value higher by 1 than the Y-axis value of the leftmost border pixel BP1 of the first line, and the X-axis value of the leftmost border pixel BP3 of the second line may have a value obtained by adding the value corresponding to the width information of the left border of the first line to the X-axis value of the leftmost border pixel BP1 of the first line.

Also, in the case in which the direction information of the right border of the first line has a first direction value, the rightmost border pixel BP4 of the second line may be a pixel disposed at the position of the second line moved from the rightmost border pixel BP2 of the first line in the direction opposite the central axis C by the number corresponding to the width information of the right border of the first line. The Y-axis value of the rightmost border pixel BP4 of the second line may have a value higher by 1 than the Y-axis value of the rightmost border pixel BP2 of the first line, and the X-axis value of the rightmost border pixel BP4 of the second line may have a value obtained by adding the value corresponding to the width information of the right border of the first line to the X-axis value of the rightmost border pixel BP2 of the first line. In the case in which the direction information of the right border of the first line has a second direction value, the rightmost border pixel BP4 of the second line may be a pixel disposed at the position of the second line moved from the rightmost border pixel BP2 of the first line toward the central axis C by the number corresponding to the width information of the right border of the first line. The Y-axis value of the rightmost border pixel BP4 of the second line may have a value higher by 1 than the Y-axis value of the rightmost border pixel BP2 of the first line, and the X-axis value of the rightmost border pixel BP4 of the second line may have a value obtained by subtracting the value corresponding to the width information of the right border of the first line from the X-axis value of the rightmost border pixel BP2 of the first line.

As described above, the border pixel extraction unit 330 may extract the leftmost border pixel and the rightmost border pixel of each of the first line to the n-th line.

The display area information generation unit 340 may generate display area information of each of the plurality of pixels P using the leftmost border pixel and the rightmost border pixel of each line.

The display area information generation unit 340 may decide the leftmost border pixel, the rightmost border pixel, and pixels provided between the leftmost border pixel and the rightmost border pixel, among pixels provided in a relevant line, as second pixels P2 provided in the second display area DA2. The display area information generation unit 340 may decide pixels other than the leftmost border pixel, the rightmost border pixel, and the pixels provided between the leftmost border pixel and the rightmost border pixel, among the pixels provided in the relevant line, as first pixels P1 provided in the first display area DA1.

The display area information generation unit 340 may set display area information of each of the first subpixels SP1 included in the first pixels P1 to a first display area value. For example, the first display area value may be 0, as shown in FIG. 10.

The display area information generation unit 340 may set display area information of each of the second subpixels SP2 included in the second pixels P2 to a second display area value or a third display area value. The display area information generation unit 340 may generates display area information in the state of dividing the second pixels P2 provided in the second display area DA2 into light-emitting pixels and non-light-emitting pixels.

In the case in which the second pixels P2 are light-emitting pixels, the display area information generation unit 340 may set display area information of each of the second subpixels SP2 included in the light-emitting pixels to a second display area value. For example, the second display area value may be 1, as shown in FIG. 10.

Meanwhile, in the case in which the second pixels P2 are non-light-emitting pixels, the display area information generation unit 340 may set display area information of each of the second subpixels SP2 included in the non-light-emitting pixels to a third display area value. For example, the third display area value may be 2, as shown in FIG. 10.

FIG. 10 illustrates that the second display area DA2 is divided into light-emitting pixels and non-light-emitting pixels in pixel units. However, the present disclosure is not limited thereto. The second display area DA2 is divided into light-emitting subpixels and non-light-emitting subpixels in subpixel units. Specifically, a plurality of second subpixels SP2 included in one second pixel P2 may all be light-emitting subpixels or non-light-emitting subpixels. Alternatively, some of a plurality of second subpixels SP2 included in one second pixel P2 may be light-emitting subpixels, and the others may be non-light-emitting subpixels.

The image processing unit 350 may change an image that is displayed on the display panel 110 using the display area information generated by the display area information generation unit 340. To this end, as shown in FIG. 11, the image processing unit 350 may include an image reception unit 351, an area decision unit 352, and an image correction unit 353.

The image reception unit 351 receives image data from an external system. At this time, the received image data may include image data of the first display area DA1 and the second display area DA2.

The area decision unit 352 decides image data of the second display area DA2 among the received image data. Specifically, the area decision unit 352 may decide image data of the second display area DA2 among the received image data based on the display area information of each of the plurality of pixels P generated by the display area information generation unit 340.

The area decision unit 352 may decide image data of second pixels P2, the display area information of each of which has a value corresponding to the second display area DA2, as image data of the second display area DA2. For example, the area decision unit 352 may decide image data of second pixels P2, the display area information of each of which has a second display area value or a third display area value, as image data of the second display area DA2.

Meanwhile, the area decision unit 352 may decide image data of first pixels P1, the display area information of each of which has a value corresponding to the first display area DA1, as image data of the first display area DA1. For example, the area decision unit 352 may decide image data of first pixels P1, the display area information of each of which has a first display area value, as image data of the first display area DA1.

The image correction unit 353 corrects the received image data by blurring the image data of the second display area DA2.

Specifically, the image correction unit 353 may blur the image data of the second display area DA2 using a predetermined blurring filter. The blurring filter may consist of n rows and n columns (n being a natural number greater than 2). For example, as shown in FIG. 12, the blurring filter may consist of three rows and three columns. Hereinafter, the blurring filter will be described as consisting of three rows and three columns, as shown in FIG. 12, for convenience of description. However, the present disclosure is not limited thereto. The size of the blurring filter may be changed.

As shown in FIG. 12, the blurring filter may include a plurality of areas having weights W0, W1, W2, W3, W4, W5, W6, W7, and W8 provided thereto. The weights W0, W1, W2, W3, W4, W5, W6, W7, and W8 of the plurality of areas may be equal to each other. However, the present disclosure is not limited thereto. The weights W0, W1, W2, W3, W4, W5, W6, W7, and W8 of the plurality of areas may be different from each other, or some may be equal to each other while some may be different from each other.

The image correction unit 353 may dispose each of the plurality of second pixels P2 provided in the second display area DA2 at the center of the blurring filter, and may correct image data of the second pixel P2 disposed at the center of the blurring filter. Specifically, in the case in which a specific pixel is disposed at the center of the blurring filter, the image correction unit 353 may also dispose eight peripheral pixels surrounding the specific pixel in the blurring filter. The image correction unit 353 may apply the weights W0, W1, W2, W3, W5, W6, W7, and W8 to image data corresponding to the specific pixel and the eight peripheral pixels, and may sum the image data having the weights applied thereto. The image correction unit 353 may correct the summed image data as image data of the specific pixel.

Meanwhile, the image correction unit 353 does not blur image data of the first display area DA1.

As a result, the image correction unit 353 may blur only image data of the second display area DA2.

In the display device 100 according to the embodiment of the present disclosure, the optical module 120 may be disposed in the second display area DA2 of the display panel 110 in an overlapping fashion. In the display device 100 according to the embodiment of the present disclosure, the second display area DA2 may have higher transmittance than the first display area DA1 such that external light is sufficiently input to the optical module 120. To this end, not only light-emitting subpixels but also non-light-emitting subpixels including no light-emitting devices and transmitting external light may be provided in the second display area DA2 of the display panel 110.

In the display device 100 according to the embodiment of the present disclosure, pixel information may be lost due to the non-light-emitting subpixels, which do not emit light, provided in the second display area DA2. In order to solve this problem, the display device 100 according to the embodiment of the present disclosure is capable of blurring image data of the second display area DA2, whereby it is possible to minimize loss of pixel information in the second display area DA2.

The control unit 360 performs control such that the corrected image is displayed on the display panel 110. To this end, the control unit 360 may generate a control signal for controlling the panel driving unit 130. The control unit 360 may generate a data control signal for controlling the data driving unit of the panel driving unit 130 and a gate control signal for controlling the gate driving unit of the panel driving unit 130. The control unit 360 may output the data control signal, the gate control signal, and an image data signal to the panel driving unit 130.

The control unit 360 may control the operation of the optical module 120. To this end, the control unit 360 may generate a control signal for controlling the optical driving unit 140, and may output the generated control signal to the optical driving unit 140.

As is apparent from the above description, according to the present disclosure, it is possible to display an image even in an area disposed so as to overlap a camera. In the present disclosure, therefore, it is possible to provide a wide image display surface and to prevent an image from being interrupted in an area in which the camera is disposed.

In addition, according to the present disclosure, it is possible to store shape information of the area disposed so as to overlap the camera and to acquire display area information and border information of each of a plurality of pixels using the shape information. In the present disclosure, therefore, it is sufficient to change only the shape information of the area disposed so as to overlap the camera stored in the memory even in the case in which the size, position, etc. of the camera is changed, whereby it is possible to easily change the shape of the area disposed so as to overlap the camera.

In addition, according to the present disclosure, it is possible to easily acquire the border of the area disposed so as to overlap the camera based only on position information of a starting point and vertical length information, line-based direction information, and width information of the area disposed so as to overlap the camera. In the present disclosure, therefore, it is possible to minimize the amount of information stored in the memory, whereby it is possible to use a small-capacity memory.

In addition, according to the present disclosure, it is possible to acquire the border of the area disposed so as to overlap the camera through simple calculation, whereby computational load is low in processing for individually controlling a general display area and a display area disposed so as to overlap the camera.

In addition, according to the present disclosure, it is possible to blur image data of the area disposed so as to overlap the camera, whereby it is possible to minimize loss of pixel information in the area disposed so as to overlap the camera.

It should be noted that the effects of the present disclosure are not limited to the effects mentioned above, and other unmentioned effects will be clearly understood by those skilled in the art from the above description of the present disclosure.

Those skilled in the art will appreciate that the present disclosure may be embodied in specific forms other than those set forth herein without departing from the technical idea and essential characteristics of the present disclosure.

For example, a data driving device according to the present disclosure may be realized in the form of an IC, and the function of the data driving device may be installed in the IC in the form of a program. In the case in which the function of the data driving device according to the present disclosure is realized as a program, the function of each component included in the data driving device may be realized as specific code, and code for realizing a specific function may be realized as a single program or as a plurality of divided programs.

Therefore, the above embodiments are therefore to be construed in all aspects as illustrative and not restrictive. The scope of the present disclosure is defined by the following claims, rather than the detailed description, and it is intended that all variations or modifications derived from the meaning, scope, and equivalent concept of the claims fall within the scope of the present disclosure.

What is claimed is:

1. A display device comprising:
   a display panel having a plurality of pixels, the display panel comprising a first display area having a first resolution and a second display area having a second resolution, the second resolution being lower than the first resolution; and a controller configured to generate display area information of the plurality of pixels, to determine second image data corresponding to the second display area based on the display area information, and to perform blurring on the second image data, wherein the plurality of pixels include first light-emitting pixels corresponding to the first display area, second light-emitting pixels and non-light-emitting pixels corresponding to the second display area, and the controller is configured to perform blurring on the second image data based on locations of the non-light emitting pixels.

2. The display device according to claim 1, wherein, based on the non-light-emitting pixels being included in the second display area among the first display area and the second display area, the controller is configured to perform the blurring only for the second image data.

3. The display device according to claim 1, wherein the controller is configured to perform blurring on the second image data based on an arrangement of the second light-emitting pixels and the non-light-emitting pixels.

4. The display device according to claim 1, wherein the controller is configured to perform blurring on the second image data using a predetermined blurring filter, and the controller is configured to perform blurring on the second image data such that a center of the predetermined blurring filter corresponds to one of the light emitting pixels.

5. The display device according to claim 1, wherein the display area information includes a first display area value corresponding to the first light-emitting pixels, a second display area value corresponding to the second light-emitting pixels, and a third display area value corresponding to the non-light emitting pixels, and the first, second, and third display area values are different.

6. The display device according to claim 1, wherein the controller is configured to not blur first image data corresponding to the first light-emitting pixels specified by the display area information in input image data.

7. The display device according to claim 1, further comprising:

a memory configured to store shape information of the second display area, wherein the shape information comprises position information of a starting point of the second display area, vertical length information indicating a vertical length of the second display area, line-based direction information related to a distance between a border of the second display area and a center axis of the second display area, and width information indicating a width of the second display area, and the controller is configured to generate the display area information based on the shape information of the second display area.

8. The display device according to claim 7, wherein the second display area comprises a left border and a right border, the left border is located at a left side of the second display area with respect to a central axis of the second display area, the right border is located at a right side of the second display area with respect to the central axis of the second display area, the shape information of the second display area comprises left border information about the left border, and right border information about the right border each of the left border information and the right border information comprises direction information and width information of each of a plurality of lines disposed within the vertical length from the starting point, the direction information included in the left border information indicates an extension direction of the left border with respect to the central axis, the direction information included in the right border information indicates an extension direction of the right border with respect to the central axis, and the width information included in the left border information indicates a distance between a leftmost point in a first line included in the second display area and a leftmost point in a second line adjacent to the first line.

9. The display device according to claim 8, wherein a width of the left border at each of a first line, at which the starting point is disposed, to an n-th line is sequentially stored in order of line as the left border information, a width of the right border at each of a first line, at which the starting point is disposed, to an n-th line is sequentially stored in order of line as the right border information, and n corresponds to the vertical length.

10. The display device according to claim 8, wherein in case a distance between the central axis and a border provided at a first line is less than a distance between the central axis and a border provided at a second line adjacent to the first line, the direction information is set to a first direction value, and in case the distance between the central axis and a border provided at the first line is greater than the distance between the central axis and a border provided at the second line, the direction information is set to a second direction value.

11. The display device according to claim 8, wherein the controller is configured to:

extract a leftmost border pixel of each line and a rightmost border pixel of each line based on the position information of the starting point, the line-based direction information, and the width information, decide the leftmost border pixel, the rightmost border pixel, and pixels provided between the leftmost border pixel and the rightmost border pixel, among pixels provided in a relevant line, as second pixels provided in the second display area, and decide other pixels in the display panel as first pixels provided in the first display area.

12. A controller comprising:

a display area information generation unit configured to generate display area information of a plurality of pixels based on shape information of a second display area having lower resolution than a first display area;

an image processing unit configured to determine second image data corresponding to the second display area based on the display area information, and to perform blurring on the second image data; and a control unit configured to control the blurred second image data to be displayed on a display panel, wherein the plurality of pixels include first light-emitting pixels corresponding to the first display area, second light-emitting pixels and non-light-emitting pixels corresponding to the second display area, and the image processing unit is configured to perform blurring on the second image based on locations of the non-light emitting pixels.

13. The controller according to claim 12, wherein, based on the non-light-emitting pixels being included in the second display area among the first display area and the second display area, the image processing unit is configured to perform the blurring only for the second image data.

14. The controller according to claim 12, wherein the image processing unit is configured to perform blurring on the second image data based on an arrangement of the second light-emitting pixels and the non-light-emitting pixels.

15. The controller according to claim 12, wherein the image processing unit comprises an image correction unit configured to correct input image data by blurring the second image data using a predetermined blurring filter, and the image processing unit is configured to perform blurring on the second image data such that a center of the predetermined blurring filter corresponds to one of the light emitting pixels.

16. The controller according to claim 15, wherein the image correction unit is configured to not blur first image data for first light-emitting pixels corresponding to the first display area.

17. The controller according to claim 12, wherein the shape information of the second display area comprises position information of a starting point at a border between the first display area and the second display area, vertical length information indicating a vertical length of the second display area, line-based direction information related to a distance between a border of the second display area and a center axis of the second display area, and width information indicating a width of the second display area.

18. The controller according to claim 17, further comprising a border pixel extraction unit configured to extract a leftmost border pixel and a rightmost border pixel of each line based on the position information of the starting point, the line-based direction information, and the width information.

19. The controller according to claim 18, wherein the display area information generation unit is configured:

to set the display area information of each of pixels other than pixels provided between the extracted leftmost border pixel and the extracted rightmost border pixel, among pixels provided in each line, to a first display area value; and to set the display area information of each of light-emitting pixels included in the pixels provided between the extracted leftmost border pixel and the extracted rightmost border pixel, among the pixels provided in each line, to a second display area value.

\* \* \* \* \*